UNITED STATES PATENT OFFICE.

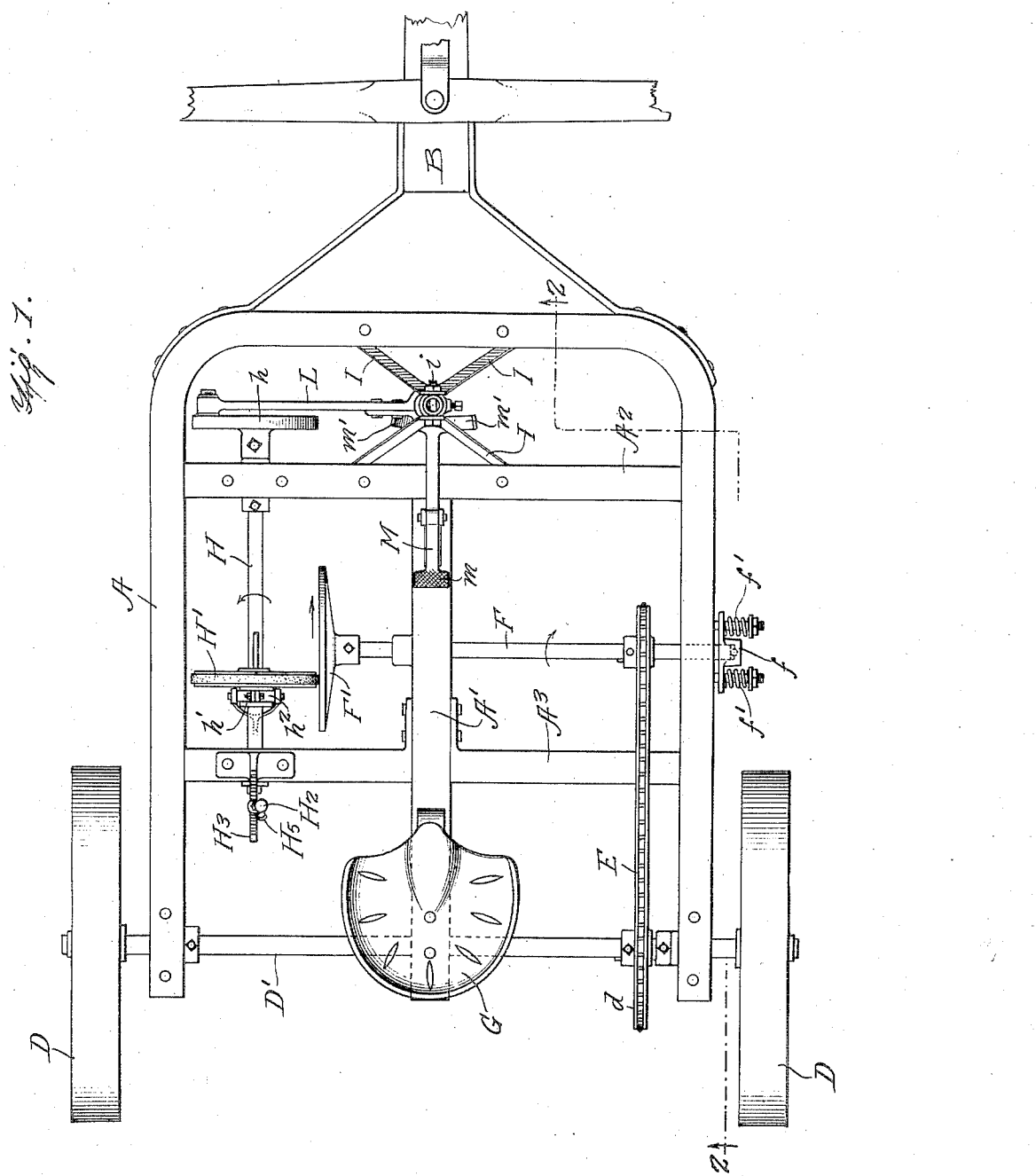

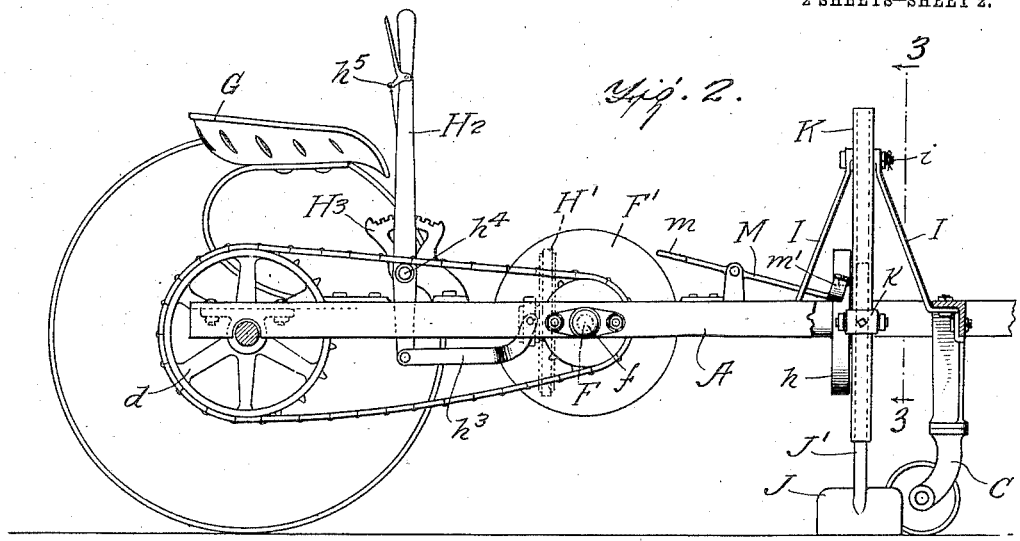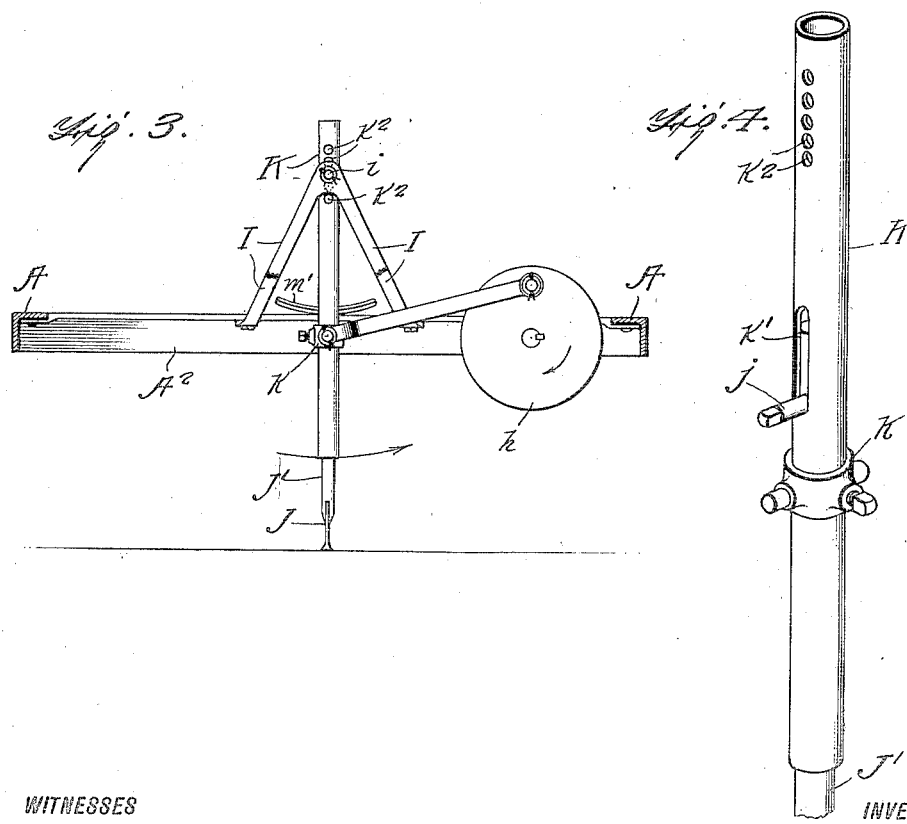

JAMES A. LOVE, OF RED SPRINGS, NORTH CAROLINA.

PLANT-SPACING MACHINE.

1,099,707.　　　　　Specification of Letters Patent.　　Patented June 9, 1914.

Application filed August 27, 1913.　Serial No. 786,885.

*To all whom it may concern:*

Be it known that I, JAMES A. LOVE, a citizen of the United States, and a resident of Red Springs, in the county of Robeson and State of North Carolina, have invented a new and useful Improvement in Plant-Spacing Machines, of which the following is a specification.

My present invention relates generally to machines for spacing plants by chopping out intervening plants, my object being to provide a simple and convenient arrangement of parts embodying a readily controllable friction drive for the chopping-hoe and a chopping-hoe pivoted in the frame of the machine to oscillate laterally thereof, which may be readily adjusted and raised to an inoperative position when desired. These and other objects will be apparent from the following description in which reference is made to the accompanying drawings forming part of this specification, and in which, Figure 1, is a plan view of my improved machine. Fig. 2, is a vertical, longitudinal section taken substantially on line 2—2 of Fig. 1. Fig. 3, is a vertical transverse section taken substantially on line 3—3 of Fig. 2, and, Fig. 4, is a detail perspective view of the upper portion of the hoe rod and its standard.

Referring now to these figures, the frame of my improved machine, indicated at A is substantially U-shaped in form and opens rearwardly, and the draft connections indicated generally at B are connected to the forward integral cross bar of the frame as particularly shown in Fig. 1. This frame A is supported by forward caster wheels C and by rear traction wheels D, the latter being mounted outside of the frame upon the projecting extremities of a transverse shaft D' journaled through the rear ends of the frame and provided with a sprocket wheel $d$ connected, by means of a sprocket chain E, to a counter shaft F extending transversely through only a portion of the main frame at a point forwardly of the main shaft D'.

One end of the counter shaft F projects outwardly through the corresponding side of the frame A and extends within a thrust cup $f$, the side portions of the cup being acted upon by springs $f'$ so as to tend to move the counter shaft longitudinally inwardly, the inner end of the shaft being journaled through an inner longitudinal frame bar A' and provided with a friction disk F' on its inner end.

The rear end of the inner longitudinal frame bar A' supports the operator's seat G and connects forward and rear transverse inner frame bars A² and A³ respectively through which is journaled a longitudinal crank shaft H adjacent to the friction disk F', the forward end of this latter shaft being provided with a crank disk $h$. Splined on the crank shaft H, is a friction wheel H' adapted for movement across and contact with the friction disk F' whereby to transmit rotation from the counter shaft F to the crank shaft H at a desired speed, the adjustment of this friction wheel H' being accomplished through the use of a groove hub $h'$ secured upon one side thereof and in the groove of which is loosely disposed a collar $h^2$ having side trunnions engaged by the forked forward end of a connecting link $h^3$, the rear end of this connecting link being pivotally connected to the lower end of an upright adjusting lever H² intermediately pivoted at $h^4$ upon a toothed segment H³, the lever having a latch mechanism $h^5$ to engage this segment.

The forward integral cross bar of the frame A and the forward transverse frame bar A² support upstanding V-shaped brackets I, the upper ends of which are inclined toward one another and receive a horizontal pivoted bolt $i$.

The chopping or thinning hoe J has an up-standing rod J' the upper end of which projects within the lower portion of a tubular standard K, this standard having an intermediate collar $k$ adjustable by a set screw or the like and provided with side trunnions engaged by one forked end of a pitman L, the opposite end of this pitman having connection with the crank pin of the crank disk $h$ before mentioned.

At a point above its collar $k$ the tubular standard K is provided with a vertical longitudinal slot $k'$ the upper end of the hoe rod J' having a pin $j$ which extends outwardly through this slot and is positioned in the lower end of the slot in the normal operation of the parts.

Adjacent its upper end the tubular standard K is provided with a vertical series of transverse apertures $k^2$ through selected ones of which the pivot bolt $i$ may be extended so as to pivot the hoe for oscillatory movement at a selected position with respect to the ground.

During the oscillatory movement of the hoe in operation its rod J' will be in lowermost position due to its own weight and inasmuch as it may be desirable to raise the hoe when transporting the machine over the field either at the start or finish of operations, I provide a foot lever M intermediately pivoted upon the inner longitudinal frame bar A', its rear end being provided with a foot piece m and its forward end being provided with upwardly curved lateral extensions m' arranged so that the extensions are beneath the projecting pin j of the hoe rod J' during the entire movement of the hoe in either direction. In this manner it is simply necessary for the operator to press down upon the foot piece m in order to raise the forward ends of the lever and its extensions m' so as to engage the pin j and raise the hoe and its rod upwardly within hollow standard K and above the line of plants.

In the operation of the machine power is transmitted to the counter shaft F from the traction wheels D through the connections before mentioned and from the counter shaft the crank shaft H is rotated at a selected speed to give the hoe a desired speed through the friction members F' and H' and the necessary adjustment of the latter is obtained by the use of the adjusting lever H².

I claim:—

1. In a machine of the character described, an oscillatory chopping hoe comprising a blade having an upwardly projecting rod, a tubular standard pivoted at its upper end to swing and provided at a point intermediate its ends with a longitudinal slot, a pin secured to the hoe rod and projecting outwardly through the slot in the standard and means for engagement with said pin to adjust the hoe rod vertically during the swinging movement of the standard.

2. A machine of the character described the combination of a frame, a hoe consisting of a blade having a vertically projecting rod, a tubular standard within which the upper end of the hoe rod is movable, having a vertical series of pivot openings adjacent its upper end and provided with an intermediate longitudinal slot, a pin secured to the upper inner end of the hoe rod and projecting outwardly through the slot, brackets upstanding from the frame, a pivot pin supported by the brackets and adapted for engaging through selected pivot openings of the standard, and a foot lever intermediately pivoted on the frame, having a foot piece at one end and provided with upwardly curved lateral extensions at its opposite end disposed beneath the outwardly projecting pin of the hoe rod, for the purpose described.

3. In a machine of the character described, the combination of a frame, a chopping hoe consisting of a blade having a vertically projecting rod, a tubular standard having an adjustable pivot adjacent its upper end within the frame, and within the lower end of which the hoe rod is extended, means whereby to permit of limited movement of the hoe rod with respect to the standard, and means mounted on the frame for moving the hoe rod with respect to the standard when desired.

JAMES A. LOVE.

Witnesses:
JOHN J. THROWER,
W. N. GIBSON.